(No Model.)  2 Sheets—Sheet 1.

M. ROTHFUSS.
ROTARY VALVE.

No. 472,717. Patented Apr. 12, 1892.

WITNESSES:
F. L. Durand
J. L. Coombs

INVENTOR:
Michael Rothfuss,
by Louis Bagger & Co.
Attorneys.

(No Model.) 2 Sheets—Sheet 2.
M. ROTHFUSS.
ROTARY VALVE.
No. 472,717. Patented Apr. 12, 1892.
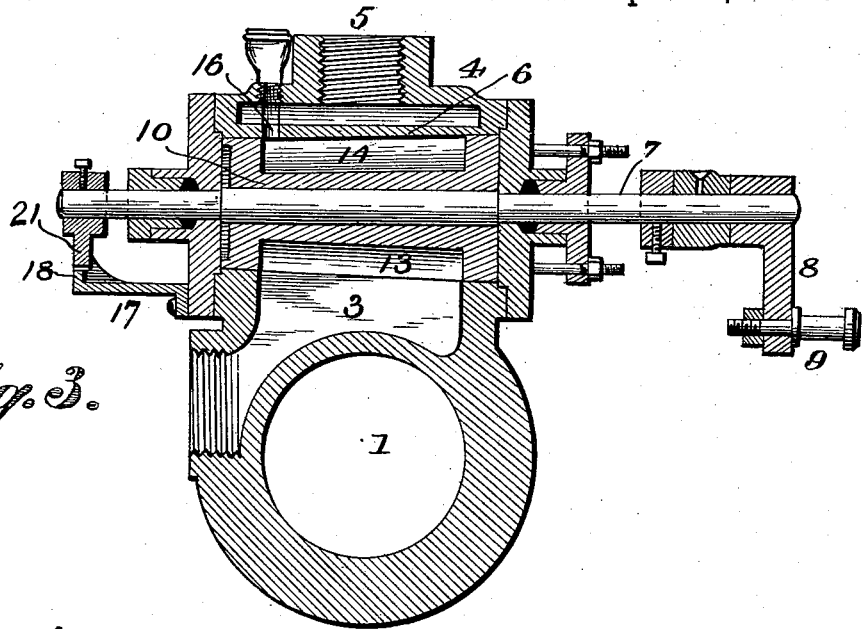
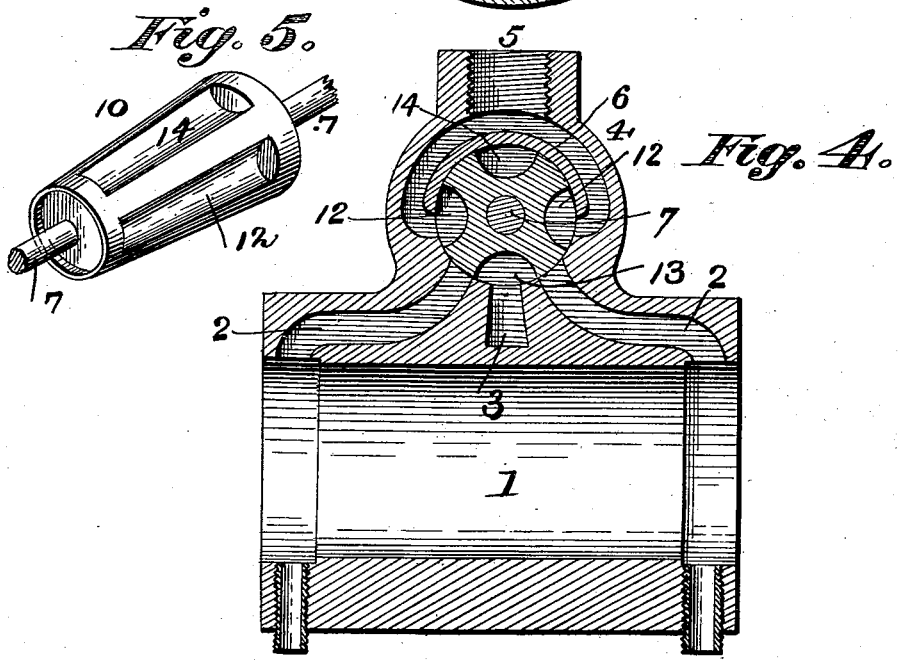
WITNESSES:
INVENTOR:
Michael Rothfuss,

UNITED STATES PATENT OFFICE.

MICHAEL ROTHFUSS, OF WILLIAMSPORT, PENNSYLVANIA.

ROTARY VALVE.

SPECIFICATION forming part of Letters Patent No. 472,717, dated April 12, 1892.

Application filed October 13, 1891. Serial No. 408,624. (No model.)

*To all whom it may concern:*

Be it known that I, MICHAEL ROTHFUSS, a citizen of the United States, and a resident of Williamsport, in the county of Lycoming and State of Pennsylvania, have invented certain new and useful Improvements in Rotary Valves; and I do hereby declare that the following is a full, clear, and exact description of the invention, which will enable others skilled in the art to which it appertains to make and use the same, reference being had to the accompanying drawings, which form a part of this specification.

My invention relates to improvements in rotary or oscillating valves for steam and other engines, the object being to provide an improved construction of valve of this description which shall possess superior advantages with respect to economy, simplicity, and efficiency.

The invention consists in the novel construction and combination of parts hereinafter fully described and claimed.

Figure 1:
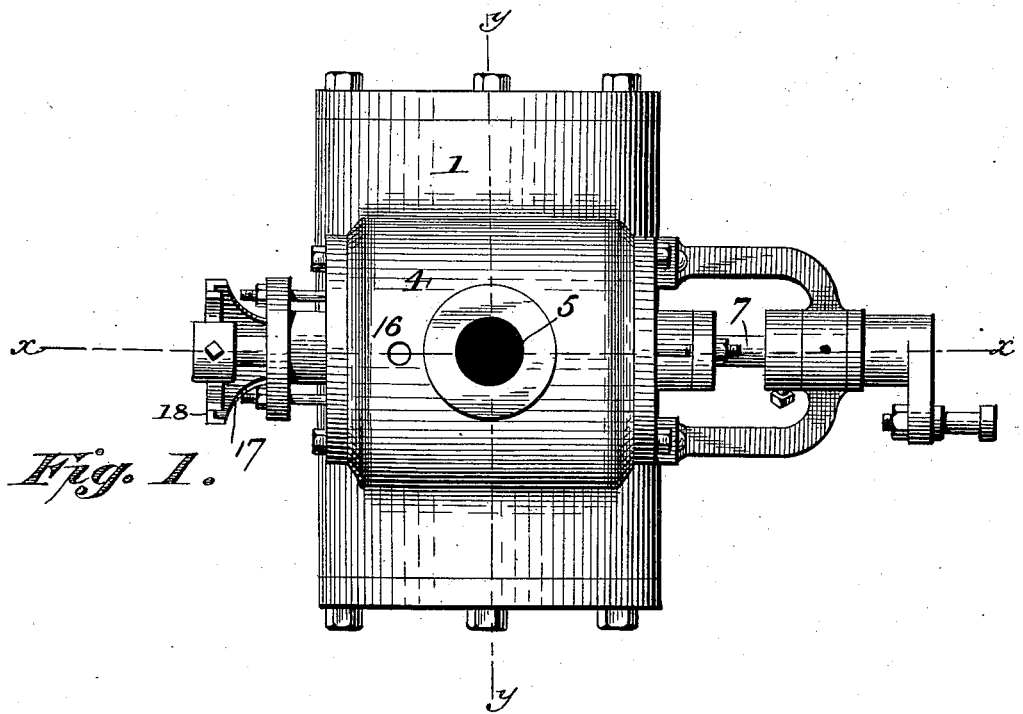
Figure 2:
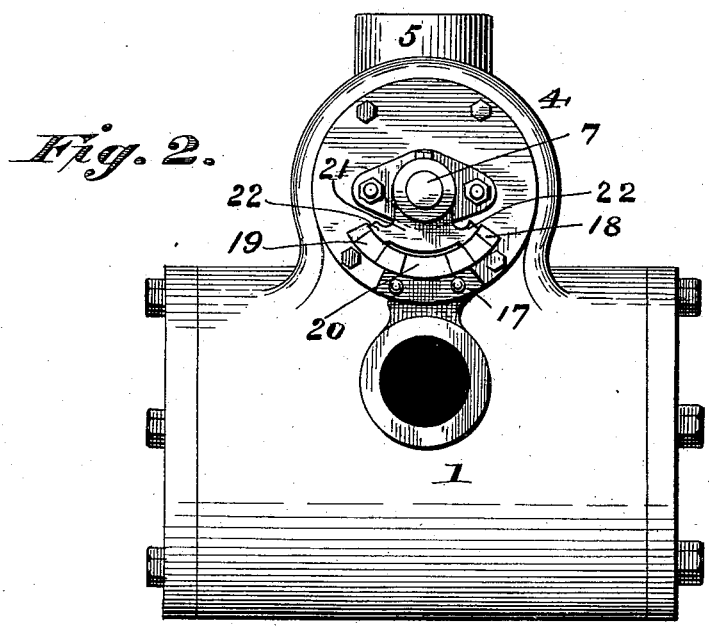

In the accompanying drawings, Figure 1 is a plan view of a valve and steam-cylinder constructed in accordance with my invention. Fig. 2 is an end view of the valve, the steam-cylinder appearing in side elevation. Fig. 3 is a section on the line $x\ x$, Fig. 1. Fig. 4 is a section on the line $y\ y$, Fig. 1. Fig. 5 is a detail perspective view of the valve.

In the said drawings, the reference-numeral 1 denotes a steam-cylinder having inlet-ports 2 and exhaust 3, as usual, which also communicate with the valve-casing. Formed with or secured to the steam-cylinder is a cylindrical valve-casing 4, having a steam-inlet 5 and a curved partition or interior wall 6. This casing is also provided with the usual heads, glands, and stuffing-boxes, in which is journaled the valve spindle or stem 7, provided at one end with a crank 8, having wrist-pin 9, which is to be connected with the eccentric-rod. (Not shown.)

The numeral 10 designates the valve formed with or secured to the stem 7, and consists of a tapering cylindrical block of metal provided upon its periphery with four equidistant tapering grooves 12, 12, 13, and 14, with the intervening wings 15, the grooves 12 12 forming the steam-passages communicating with the induction-port, while the groove 13 constitutes the exhaust-passage.

The groove-chamber 14 constitutes a receptacle for oil or other lubricating material, the curved partition forming a cover for the same, through which a passage 16 communicates with an oil-cup. At the end of the curved partition steam is admitted to each side of the valve to equalize the pressure upon the valve. By forming a deep receptacle upon the upper side of the valve for the oil any sediment or grit would settle in the bottom and prevent it from coming in contact with the moving part or between the valve and its seat, thereby preventing cutting of the same. The valve can be easily removed to clean out the oil-receptacle. Upon each oscillation of the valve oil is fed to the seat.

The numeral 17 designates an outwardly-projecting arm secured to one of the heads of the valve-casing and provided with a segment 18, divided by means of radial lines into spaces 19 19 and 20, the spaces 19 corresponding with the steam-passages in the valve-casing and the space 20 with the exhaust-passage therein. Secured to the valve-stem directly over the segment is a downwardly-depending arm 21, cut away at its center, forming two wings 22 22, which oscillate with the valve-stem and which coincide or correspond with the wings of the valve intermediate of the steam-passages. The wings 22 and the spaces 19 and 20 are directly proportioned to the valve and the steam and exhaust ports, so that the position of the valve with respect thereto can at all times be readily ascertained. By this construction, also, the eccentric may be adjusted so as to give more or less lap to the valve without taking the valve apart. The engineer or person in charge of the engine can also ascertain at any time if the valve is properly working by consulting the segment and noticing whether or not the wings and spaces properly register.

I am aware that an oscillating valve has heretofore been constructed provided with a graduated index or dial and the valve-stem having a hand or pointer. This, however, is not my invention and is not claimed by me, my invention contemplating a segment divided into spaces directly proportioned to the inlet and exhaust ports, and oscillating wings adapted to register therewith and proportioned to the valve, said wings and spaces at all times indicating the position of the valve and its steam-passages with respect to the inlet and exhaust ports in the valve-casing.

Having thus described my invention, what I claim is—

In an oscillating valve, the combination, with the casing provided with steam inlet and induction and exhaust ports and with a curved partition or wall, of the valve having grooves and wings forming inlet and exhaust passages, the groove on the upper side closed at each end to form an oil-receptacle which is covered by the said curved partition, and an oil-passage in the casing and partition communicating with said oil-receptacle, substantially as and for the purpose set forth.

In testimony that I claim the foregoing as my own I have hereunto affixed my signature in presence of two witnesses.

MICHAEL ROTHFUSS.

Witnesses:
 LOUIS BAGGER,
 BENNETT S. JONES.